Sept 17, 1957  A. MAZZOLA  2,806,907
ELECTRICAL CONTROL SWITCH
Filed Oct. 30, 1953  3 Sheets-Sheet 1

INVENTOR
AMBROSE MAZZOLA
BY Thomas P. Mahoney
ATTORNEY

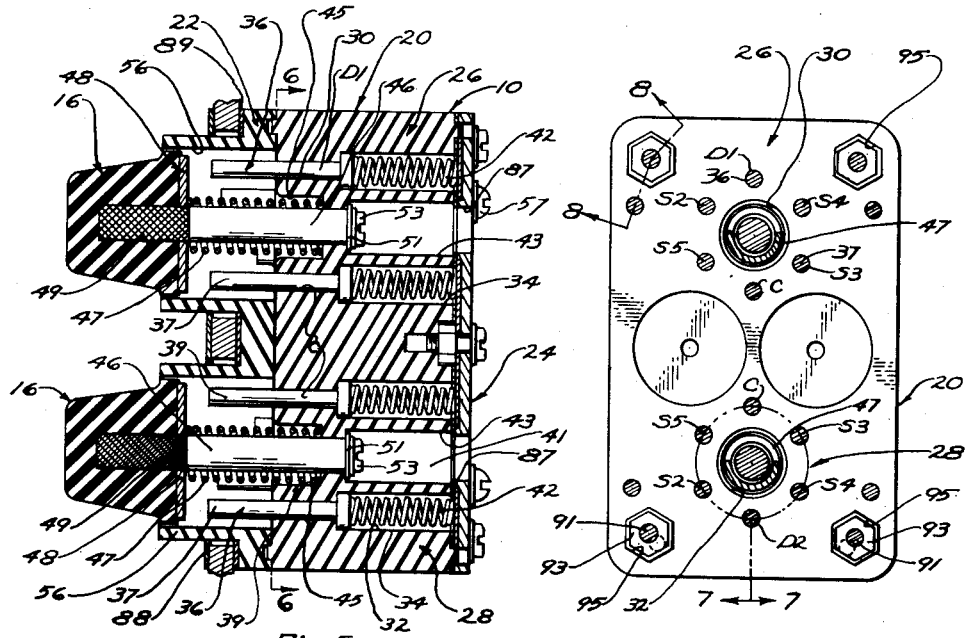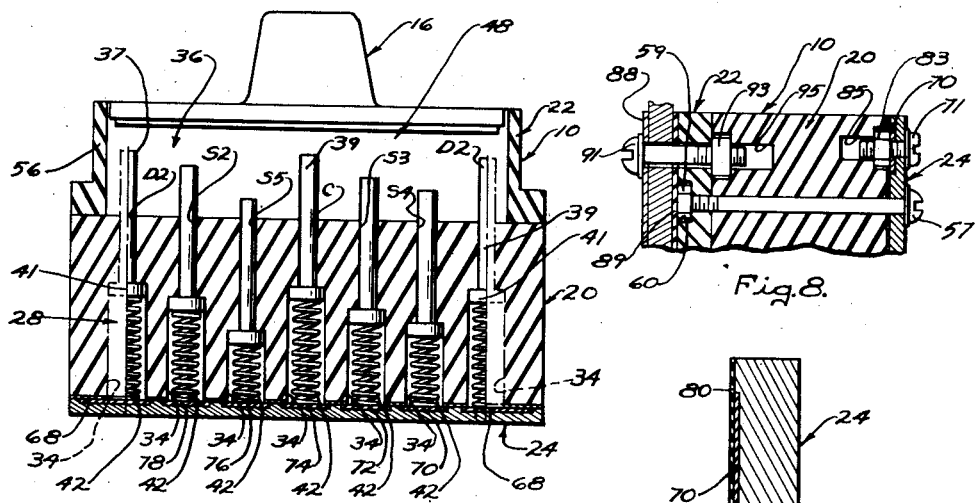

INVENTOR
AMBROSE MAZZOLA
BY Thomas P. Mahoney
ATTORNEY

United States Patent Office 2,806,907
Patented Sept. 17, 1957

2,806,907

ELECTRICAL CONTROL SWITCH

Ambrose Mazzola, Temple City, Calif.

Application October 30, 1953, Serial No. 389,424

12 Claims. (Cl. 200—5)

This invention relates to an electrical control switch and, more particularly, to an electrical control switch for controlling both the direction of rotation and speed of an electric motor associated therewith.

In order to fully disclose both the structure and mode of operation of the electrical control switch, it will be described as utilized in controlling both the driving and hoisting motors of an overhead crane, but it is, of course, to be understood that the principles of the invention can be applied with equal cogency to control switches utilized in other applications and that the control switch of the invention may be used to control the speed and direction of rotation of an electric motor in an apparatus other than an overhead crane.

Directional and variable speed control switches conventionally used in controlling both the direction of rotation and speed of electric motors are usually quite complex in construction because of the necessity of providing a large number of individual contacts to obtain the necessary modulus of control of the speed of the motor to control the speed of the apparatus in which the motor is mounted. The incorporation of the large number of contacts also involves the provision of a large number of electrical connections which necessitates relatively elaborate wiring in a necessarily small housing.

It is, therefore, an object of my invention to provide a directional and variable speed control switch for an electric motor which, due to its inventive features, eliminates the complex wiring customarily found in conventional switches of the type under consideration.

Another object of my invention is the provision of a switch of the aforementioned character which can be utilized interchangeably to control either the driving motor or the hoisting motor of an overhead crane or similar apparatus. An associated object of my invention is the provision of a control switch of the aforementioned character which is fabricated from interchangeable parts which can be readily utilized in other control switches of the same character, thus eliminating the necessity for the maintenance of large stocks of different component parts.

A common problem encountered in the utilization and maintenance of control switches of the character under consideration is the excessive wear occasioned by the frictional engagement between the actuator button and the contacts engaged thereby to vary both the direction of rotation and speed of the motor associated therewith. This frictional engagement ultimately results in excessive wear of the component parts of the switch and in the need for the application of excessive pressure to depress the actuator button or other actuator means associated with the switch.

An additional object of my invention is the provision of a directional and variable speed switch which eliminates much of the frictional wear encountered in prior art switches and which, because of the elimination of frictional engagement between the various components of the switch, permits the switch to be actuated by the application of minimum pressures to the actuator button thereof.

A further object of my invention is the provision of a directional and variable speed control switch which incorporates a unitary housing mounting a plurality of movable contacts, the housing having a backing plate secured thereto provided with integral conductors on the surface thereof adjacent the housing, said integral conductors being disposable in circuit relationship with one another when the contacts are moved in the housing by the actuator button associated therewith. The provision of the backing plate on the housing of the switch eliminates the necessity for the large number of jumper connections encountered in prior art switches of the character under considerations since, as in the switch of my invention, the same integral conductor on the backing plate can be utilized with two groups of contacts and two different actuators to accomplish either the initiation of rotation of an electric motor or the variance of the speed thereof.

A further object of my invention is the provision, in a switch of the aforementioned character, of a unitary housing which incorporates a plurality of contact receiving bores, said bores each being of different depth than an adjacent bore and all of said bores being adapted to receive movable contacts of substantially uniform length. By the provision of a housing of this character, the necessity for providing contacts of different length or contacts which are secured to the housing in different positions is eliminated and substantial economies in both the fabrication and assembly of the switch of my invention are achieved.

Since a great deal of the wear encountered in switches of the character under consideration results from the utilization of a common conductor of some sort in association with a movable actuator or button, it is usually necessary to replace the common conductor more frequently than any other component of the switch. The replacement of the common conductor in prior art switches usually entails the complete dismantling of the switch and its associated components which is both a time-consuming and expensive operation.

Another object of my invention is the provision, in a switch of the aforementioned character, of a switch housing having an actuator button mounting bore extending from the front to the rear thereof, said bore being adapted to receive the mounting for the actuator button which is accessible from the rear of the housing and which can be released from the rear of the housing to permit the actuator button and an associated common conductor to be removed from the front of the housing or the front of an enclosure in which it is disposed without the necessity for dismantling the switch or the component portions thereof.

Other objects and advantages of my invention will be apparent from the following specification and the accompanying drawings which are for the purpose of illustration only and in which:

Fig. 5 is a vertical, partly sectional view of a switch constructed in accordance with my invention;

Fig. 6 is a front elevational view of the housing of the switch taken on the broken line 6—6 of Fig. 5;

Fig. 7 is a development taken on the broken line 7—7 of Fig. 6;

Fig. 8 is a vertical, partly sectional view taken on the broken line 8—8 of Fig. 6;

Fig. 9 is an enlarged, fragmentary view of a portion of the backing plate of the switch;

Fig. 10 is an isometric view showing the common conductor associated with the actuator button of the switch;

Figure 1:
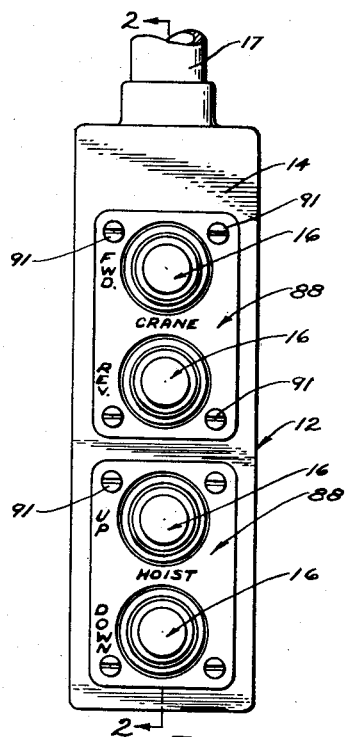
Fig. 1 is a front elevational view of a pair of switches of my invention incorporated in a common enclosure.
Figure 2:
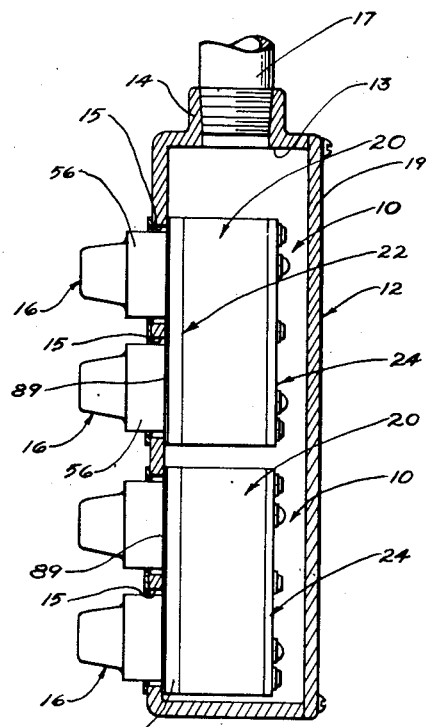
Fig. 2 is a vertical sectional view taken on the broken line 2—2 of Fig. 1.

Referring to the drawings, and particularly to Figs. 5–14 thereof, I show a directional and speed control switch 10 constructed in accordance with my invention and which can be mounted, as best shown in Figs. 1–2, in a substantially rectangular switch box or enclosure 12. The switch box or enclosure 12 defines a chamber 13 having a front wall 14 in which is provided a plurality of superposed openings 15. The openings 15 communicate with the chamber 13 in the interior of the switch box 12 and are designed to receive the actuator buttons 16 for the switches 10 disposed in the chamber 13 to facilitate the actuation of the switches 10 by the inward deflection of the actuator button 16.

Secured to the upper end of the switch box 12 is a conduit 17, said conduit constituting a support for the switch box 12 to maintain it in a predetermined position with respect to a crane or other overhead apparatus to which it is secured, and also serving as an enclosure for conductive leads, not shown, connected to the switches 10 incorporated in the box 12 and connected to the apparatus with which the switch box 12 is associated. A closure plate 19 is secured to the rear of the switch box 12 and is demountable therefrom to permit access to the switches 10 located in the chamber 13.

Figure 11:
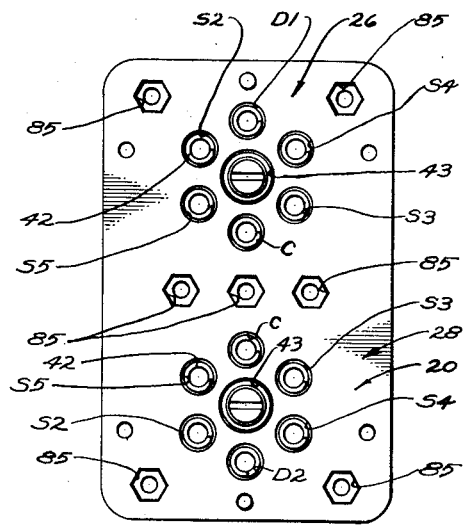
Fig. 11 is a rear elevational view of the switch housing.

The switch 10 of my invention, as best shown in Fig. 5 of the drawings, includes a substantially rectangular unitary body or housing 20 formed from a phenolic resin or similar insulating material. The housing 20 has a front plate 22 and a back plate 24 secured thereto, in a manner which will be described in greater detail below, and has first and second groups of symmetrically oriented contact receiving bores 26 and 28 provided therein and extending therethrough, as best shown in Figs. 6 and 11 of the drawings. In the present instance, the first and second groups of contact receiving bores 26 and 28 are arranged in a circle about associated actuator receiving bores 30 and 32, respectively, but it should be understood that the invention is not limited to any specific arrangement of the contact receiving bores or the actuator receiving bores associated therewith.

The contact receiving bores constituting the first group 26 include a directional control bore D1, a plurality of speed control bores S2—S5, and a common conductor bore C. Each of these bores is, as best shown in Fig. 7 of the drawings, longer or shorter than an adjacent bore but the lengths of the directional control and common conductor bores D1 and C are identical, for a purpose which will be described in greater detail below. It will be noted that the respective bores are counterbored, as at 34, and that the counterbored portions thereof differ in length to the same degree as the bores with which they are associated.

Disposable in the individual bores of the first group of contact receiving bores 26 are movable contacts 36 constituted by elongated contact pins 37 which are of substantially uniform length and which incorporate elongated shank portions 39 disposable in their respective bores and enlarged head portions 41 exposable in the counterbored portions 34 thereof. Located in each of the counterbored portions 34 of the aforementioned bores are resilient conductors or springs 42 whose lengths are proportioned to the lengths of the counterbores within which they are associated and the ends of which project from the end of their respective counterbores into engagement with the adjacent surface of the backing plate 24, for a purpose which will be described in greater detail below. The springs 42 thus serve as conductors between the movable contacts 36 and the backing plate 24 and are also adapted to maintain the contacts 36 with their outermost ends projecting from the front of the housing 20.

Despite the fact that the pins 37 constituting the movable contact 36 are of substantially uniform length, the outermost ends thereof project unequal distances beyond the front of the housing 20, with the exception of the pins located respectively in the directional control and common conductor bores. The unequal projection of the outer ends of the pins 37 beyond the front of the housing 20 is attributable to the unequal length of the contact receiving bores. This permits the utilization in the switch 10 of contact pins 37 of substantially uniform length and avoids the necessity of providing contact pins of different lengths to accomplish the unequal projection thereof beyond the front of the housing 20.

Therefore, the need for the provision of different lengths of pins 37 is eliminated and the pins 37 can be inserted into the bores in random fashion which materially reduces the cost of manufacture and assembly of the switch 10. The movable mounting of the contact pins 37 in the housing 20 permits them to be easily deflected and reduces the frictional loads occasioned by the deflection of actuator buttons in prior art devices, thus materially reducing the wear occasioned by excessive frictional contact.

Each of the actuator receiving bores 30 and 32, respectively, is counterbored, as at 43 and 45, Fig. 5 of the drawings, and is designed to receive an elongated guide rod 46 upon the outer end of which is mounted the associated actuator button 16, said button being formed from hard rubber to insulate the same from conductive relationship with the guide rod 46. Disposed in the counterbores 45 are elongated compression springs 47 which encompass the guide rods 46 and which are designed to extend the actuator buttons 16 from the switch 10 by engagement with common conductors 48 constituted by annular discs provided with centrally located openings 49 therein.

The common conductors 48 are pressed upon the guide rods 46 immediately adjacent the undersides of their respective actuator button 16 and the end of the associated spring 47 is seated thereupon to urge the button 16 outwardly from the front of the switch 10. Secured to the rear end of each of the guide rods 46 is a retaining washer 51 engageable with the shoulder defined by the counterbore 43 and retained in operative relationship with the end of the guide rod 46 by a fastening screw 53. The fastening screw 53 is, of course, removable from its operative relationship with the end of the guide rod 46 and the retaining washer 51 can also be removed from the end of the guide rod 46 to permit the guide rod 46 to be withdrawn from the front of the switch 10 to permit access to be had, either to the movable contacts 36 or to facilitate the replacement of the actuator button 16 or its associated spring 47.

The front plate 22 is molded from a phenolic resin material of the same kind as that which is used in molding the housing 20 and has integrally formed therewith a pair of outwardly directed collars 56, said collars encompassing the bases of associated actuator buttons 16 and serving as guides therefor. The front plate 22 is maintained in operative relationship with the front of the housing 20 by means of elongated bolts 57, the ends of which are engaged in nuts 59 received in recesses 61 provided in the front plate 22, as best shown in Fig. 8 of the drawings.

When the front plate 22 is disposed in operative relationship with the housing 20 by means of the elongated bolts 57, the outer ends of the contact pins 37 project upwardly into the collars 56 provided upon said front plate and underlie the common conductor mounted upon the actuator button 16. Therefore, inward movement of the actuator button 16 in its associated collar 56 against the bias of the spring 47 will carry the common conductor 48 associated therewith inwardly into engagement with the contact pins 37. The inward movement of the common conductor 48 by its associated actuator button 16 will cause initial engagement of the pins 37 mounted respectively in the directional and common conductor bores since said pins, as best shown in Fig. 7 of the drawings, project an equal distance beyond the front of the housing 20. Therefore, an initial circuit is made between the pins in the common conductor and directional bores through the common conductor 48 on the actuator button 16 to initially energize the electric motor associated with the switch 10 in the desired direction of rotation. Subsequent movement of the actuator button 16 will cause the common conductor 48 to successively engage individual ones of the remaining contact pins 37.

The order of engagement of the speed varying contact pins is that the pin in the bore S2 is first engaged and the pin in the bore S5 is last engaged, due to the inequalities of projection of the pins in the bores S2—S5. Thus, as the actuator button 16 is moved inwardly in its associated collar 56, the motor associated with the switch 10 is first energized and the speed thereof increased as desired by successive engagements of the speed control pins mounted in the bores S2—S5.

Of course, as the individual pins are engaged after the initial engagement of the pins located in the directional bores D1 and D2 and the common conductor bores C, each of the pins 37 is moved inwardly against the bias of its associated spring 42 to permit contact to be made with the next pin in the series. However, since there is no rubbing engagement between the common conductor 48 and the individual contact pins 37 and since they are freely movable against the bias of their associated springs 42, frictional loads are reduced to a minimum and the actuator buttons 16 can be moved inwardly with relative ease. However, initial engagement of the pins 37 with the common conductor 48 mounted in association with the actuator button 16 provides the desired "feel" which will permit the operator of the apparatus with which the switch 10 is associated to sense the engagement of the respective contact pins 37 so that he may determine when a pin controlling the speed of the motor with which the switch 10 is associated has been engaged by the common conductor 48. It is thus readily apparent that the provision of the movable contact pins 37 and the cooperative relationship therebetween permits the elimination of frictional loads encountered in conventional switches of the character under consideration and materially enhances both the ease of operation and the useful life of the switch 10.

Figure 12:
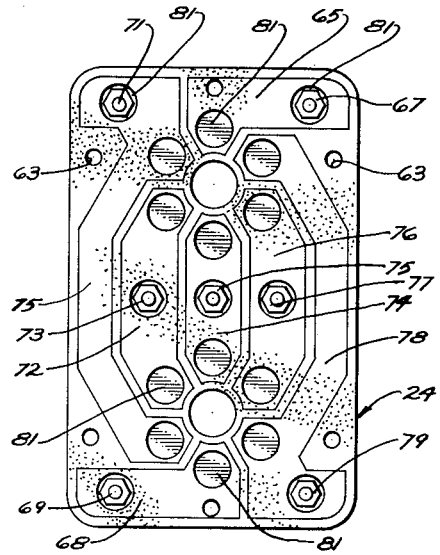
Fig. 12 is a plan view of the backing plate associated with the switch housing.
Figure 13:
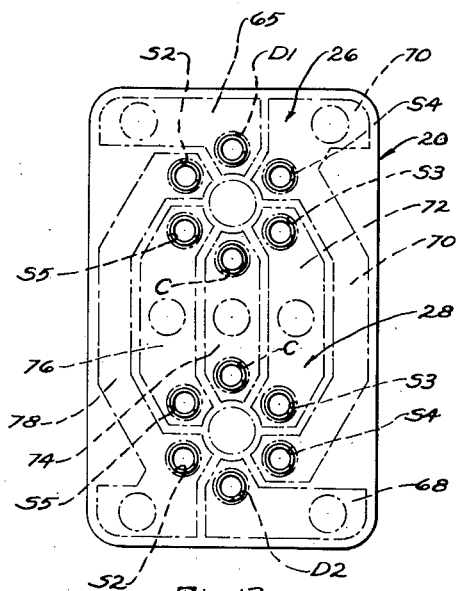
Fig. 13 is a composite view showing the relationship between the integral conductors of the backing plate shown in Fig. 12 and the contacts incorporated in the switch.

The back plate 24 is, as best shown in Fig. 12 of the drawings, provided with mounting openings 63 for the reception of the shanks of the elongated bolts 57 which thus serve to secure the back plate 24 to the rear of the housing 20, as best shown in Fig. 8 of the drawings. The backing plate is formed from phenolic plastic or other dielectric material and has a plurality of conductors secured to the surface thereof adjacent the back of the housing 20, said conductors being formed from extremely thin sheets of copper applied to the surface of the back plate 24 and including a directional conductor 65 which is provided with a terminal 67. The conductor 65 is engageable by the conductor spring 42 disposed in the counterbored portion of the bore D1 to electrically connect the conductor 65 and the contact 37 disposed in said bore.

A common conductor 74 is provided on the back plate 24, said common conductor having a terminal 75 and being engageable at its opposite ends by the springs 42 disposed in the common conductor bores C to electrically connect the contact pins 37 in said bores to the conductor 74. A second directional conductor 68 is provided at the opposite end of the back plate 24 and is connected to a terminal 69, said second directional conductor being engageable by the conductor spring 42 disposed in the directional bore D2 to electrically connect the pin 37 disposed therein with the second directional conductor 68.

It is readily apparent, therefore, that if the actuator button 16 associated with the first group of contact receiving bores 26 is depressed, the pins 37 disposed in the bores C and D1 will be initially engaged by the common conductor 48 mounted upon the guide rod 46 to initiate the rotation of an electric motor associated with the switch 10 in one direction. On the other hand, if the actuator button 16 associated with the second group of contact receiving bores is depressed, the contact pins 37 disposed in the bores D2 and C will be engaged to dispose the conductors 68 and 74 in circuit and cause the rotation of the electric motor in an opposite direction. Therefore, the first and second directional conductors 65 and 68 and the common conductors 74 determine the direction of rotation of the motor associated with the switch 10 and the initial energization thereof.

Also provided on the back plate 24 are elongated speed conductors 70, 72, 76, and 78 which have terminals 71, 73, 77, and 79, respectively, associated therewith.

All of the conductors, including the directional control conductors and the speed varying conductors, have the major portions of their lengths covered by a masking coat of dielectric material 80, but all of them are provided with exposed areas 81 adjacent the ends of the conductor springs 42 and the terminals individually associated with said conductors. The symmetrical arrangement of the exposed areas 81 of the aforesaid conductors in relationship with the ends of the conductor springs 42 is graphically illustrated in Fig. 12 of the drawings, while Figs. 10 and 13 of the drawings clearly illustrate the relationship between the individual contact receiving bores and the conductors with which they are associated.

For instance, as best shown in the aforementioned figures, the bores S2—S5 are respectively associated with the elongated speed varying conductors 70, 72, 76, and 78. Therefore, the conductor springs 42 mounted in the counterbored portions 34 of any one of these bores in either of the first or second groups of bores 26 or 28, respectively, is maintained in constant engagement with its respective conductor and one conductor will serve as a jumper for the contact pins of the two groups.

For instance, the conductor 70 serves as a jumper between the contact pins 37 and associated conductor springs 42 located in the bores S4 of the first and second groups of bores 26 and 28, respectively. In this manner, the speed varying conductors 70, 72, 76, and 78 are capable of serving the contact pins 37 in the two groups of contact receiving bores and the necessity for providing jumper wiring between the exposed areas 81 is eliminated. Of course, the concept of applying the conductors directly to the back plate 24 of the housing and of utilizing individual conductors in conjunction with the contact pins 37 disposed in both groups of contact receiving bores materially reduces the time necessary for the fabrication of the switch 10 and also eliminates the complex wiring characteristic of prior art switches.

The manner in which the depressing of an actuator button 16 will cause the various conductors on the back plate 24 to be disposed in circuit relationship is graphically illustrated in Fig. 7 of the drawings. When the button 16 is initially depressed, a common conductor 48 mounted thereupon engages the contact pins 37 mounted in the contact receiving bores D2 and C to initiate the operation of the motor associated with the switch 10 in a desired direction. The engagement of the common conductor 48 with the aforementioned pins 37 places the second directional conductor 68 and the common conductor 74 in circuit relationship and thus accomplishes the aforementioned rotation of the electric motor in the desired direction. Subsequent inward movement of the button 16 causes successive engagement of the contact pins 37 located in the speed varying bores S2—S5 successively placing the speed varying conductors 78, 72, 70, and 76 in series relationship with one another in the order outlined.

Of course, the depression of the other actuator button 16 associated with the bore 30 will cause the engagement of the common conductor 48 associated therewith with the contact pins located in the first group of contact receiving bores 26 to engage the respective conductors in the same manner.

The manner in which the various terminals associated with the conductors on the back plate 24 are secured to the back plate and in operative relationship with the conductors is illustrated in Fig. 8 of the drawings wherein the terminal 71 is exemplified as a bolt maintained in operative relationship with the conductor 70 by means of a nut 83, said nut and the shank of said bolt being receivable in a recess 85 provided in the back side of the housing 20 of the switch 10. In this manner, the terminal 71 is electrically connected to the conductor 70 and the same relationship exists between the other conductors and the terminals associated therewith.

The provision of the recesses 85 in the back of the housing 20 of the switch 10 permits the back plate 24 to be mounted flush on the housing 20 and also permits the conductors or springs 42 to engage the conductors on the surface of the back plate 24 adjacent the back of the housing 20.

Figure 14:
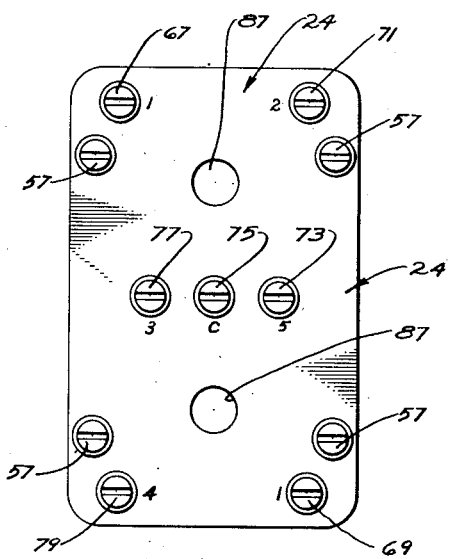
Fig. 14 is an elevational view showing the rearmost side of the backing plate as applied to the housing of the switch.

A pair of vertically spaced openings 87 is provided in the back plate 24, as best shown in Figs. 5 and 14 of the drawings, said openings registering with the counterbored portions 43 of the actuator receiving bores 30 and 32 to permit access to be had to the fastening screws 53 which secure the retaining washers 51 to the ends of the guide rods 46 for the actuator buttons 16. Therefore, when it is desired to release the guide rods 46 from operative relationship with the housing 20 of the switch 10, it is merely necessary to insert a screwdriver or similar tool through the openings 87 into the counterbored portions 43 of the actuator receiving bores 30 and 32 to release the fastening screws 53 and to permit the actuator buttons 16 to be removed from the front of the housing 20 without further disassembly of the component portions thereof.

When the switch 10 is mounted in operative relationship with the switch enclosure 12, as best shown in Figs. 1-2, 5, and 8 of the drawings, the outwardly extending collars 56 are located in the openings 15 in the front wall 14 of the switch enclosure, thus serving to locate the switch 10 within the chamber 13 of the switch enclosure 12. In order to secure the switch 10 in operative relationship with the front wall 14 of the switch enclosure 12, a name and directional plate 88 is provided.

The plate 88 is secured to the front plate 22 by means of bolts 91 and nuts 93, as best shown in Fig. 8 of the drawings, the ends of the bolts and said nuts being received in recesses 95 provided in the front of the housing 20. Therefore, by the removal of the bolts 91, the switch 10 can be readily released from the front wall 14 of the enclosure 12 and an identical switch substituted therefor.

The manner in which the switch 10 of my invention can be utilized to control the driving motor of an overhead crane and the lifting motor thereof is clearly shown in Fig. 1 of the drawings wherein the top switch is used to control the driving motor of the crane and the bottom switch is used to control the movement of the motor associated with the hoist mounted on said crane. Thus, in the top switch, if the top actuator button 16 is depressed, the crane will move in a forward direction and will move in a reverse direction if the bottom actuator button 16 is depressed. Of course, further depression of either one of the buttons will cause acceleration of the crane in the selected direction. On the other hand, if the bottom switch 10 is utilized and the top button 16 depressed, the hoist will move upwardly, while the depression of the bottom button 16 of the bottom switch 10 will cause downward movement of the hoist.

It is readily apparent, therefore, that the switch 10 of my invention can be applied for universal use in devices incorporating electric motors which must be both directionally and speed controlled. Furthermore, because of the compact and simple construction of the switch 10 of my invention, it is possible to readily mount a plurality of the switches in an enclosure such as the enclosure 12 as illustrated in Figs. 1–2 of the drawings.

Figure 3:
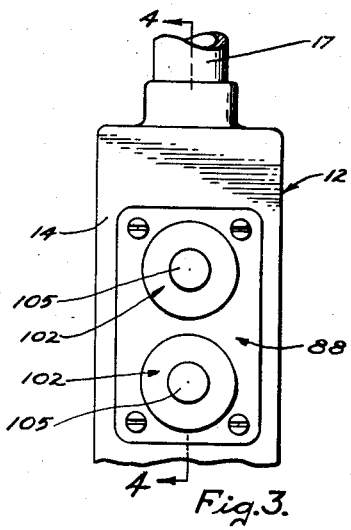
Fig. 3 is a fragmentary, front elevational view of an enclosure incorporating a switch of my invention in conjunction with an actuator button cover to prevent the ingress of moisture or other contaminants to the interior of the enclosure in which the switch is mounted.
Figure 4:
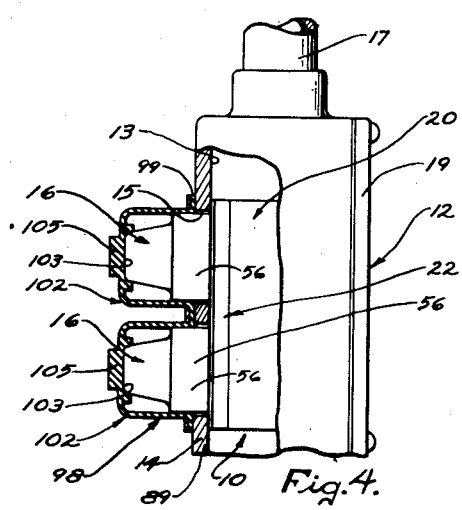
Fig. 4 is a fragmentary, partly sectional view taken on the broken line 4—4 of Fig. 3.

Since the switches 10 of my invention and the enclosures 12 in which they are mounted are frequently used in areas where they are subject to excessive moisture or liquid contaminants, I provide a weather shield 98, best shown in Figs. 3 and 4 of the drawings, which is formed of rubber or similar flexible material and includes a substantially rectangular base 99 receivable within openings in the name plate 88 and abutting against the exterior of the front wall 14 of the enclosure 12. The base 99 has integrally formed therewith a pair of outwardly projecting cylindrical enclosures 102, the outermost ends of which are provided on the interior thereof with shallow recesses 103 for receiving the outermost ends of the actuator buttons 16, as best shown in Fig. 4. Formed on the exterior surfaces of the ends of the enclosures 102 are protuberances 105 which are engageable by the finger of the operator and which can be depressed inwardly to cause concomitant inward movement of the selected actuator button 16.

As the button 16 moves inwardly, the enclosure 102 collapses inwardly in an accordion-like fashion but resumes its normal configuration when the button 16 is released to permit it to return to its normally extended position. In this manner, the interior of the switch enclosure 12 is isolated from the contaminating influence of moisture and other liquids or gases.

I thus provide by my invention a speed and directional control switch which is characterized by simplicity of construction and universality of application. Furthermore, by eliminating the extensive wiring required in prior art switches, I provide a more easily and economically manufactured switch which can also be more readily and cheaply assembled. Furthermore, because of the universality of application of the switch, one can be readily substituted for another in a particular application without the necessity for extensive rewiring of the entire switch housing.

Another salient feature of my invention is the provision of movable contacts engageable with a common conductor which eliminates the frictional wear and tear due to sliding engagement between the contacts of prior art devices and the fixed contacts thereof.

I claim as my invention:

1. In a directional and variable speed control switch for an electric motor, the combination of: a housing having a plurality of contact receiving bores extending from the front to the back of said housing, each of said bores being counterbored at the rearward portion thereof; a movable contact disposed in each of said bores, said movable contacts having expanded portions receivable in said counterbores to retain them in operative relationship therewith; a back plate secured to said housing having conductors thereupon juxtaposed to the ends of said bores and electrically connected to said contacts; a common conductor mounted in said housing; and a movable actuator button for making a circuit between said common conductor and said movable contacts.

2. In a directional and variable speed control switch for an electric motor, the combination of: a housing having a plurality of contact receiving bores of different depths; a movable contact disposed in each of said bores, said contacts being of the same length; a back plate secured to said housing having conductors thereupon juxtaposed to the ends of said bores and electrically connected to said contacts; a common conductor mounted in said housing; and a movable actuator button for making a circuit between said common conductor and said movable contacts.

3. In a directional and variable speed control switch for an electric motor, the combination of: a housing incorporating a group of symmetrically oriented contact receiving bores each of which differs in depth from an adjacent bore; a movable contact disposed in each of said bores, said contacts being of uniform length; a back plate secured to said housing having conductors thereupon juxtaposed to the ends of said bores and electrically connected to said contacts; and an actuator button for making a circuit between a common conductor and said movable contacts.

4. In a directional and variable speed control switch for an electric motor, the combination of: a housing having a plurality of contact receiving bores therein, each of which is of different depth than an adjacent bore; a plurality of movable contacts disposable in said bores, each of said contacts being of uniform length but projecting a different distance from said housing than an adjacent contact due to the difference in the depth of its respective bore; resilient means biasing said contacts in said bores and serving as a means of electrical connection therefor; a backing plate secured to said housing, said plate having conductor means thereupon juxtaposed to the ends of said bores and engageable by said resilient means for electrically connecting said contacts to said plate; and an actuator button having a common conductor thereupon engageable with said contacts for electrically connecting said conductors on said plate.

5. In a directional and variable speed control switch for an electric motor, the combination of: a housing provided with a symmetrically oriented plurality of contact receiving bores, said bores being divided into a first group of bores of identical depth for the reception of directional contacts and a second group of bores of progressively decreasing depth for speed varying contacts; a movable contact disposed in each of said bores and having an end projecting beyond the front of said housing; a plate secured to the back of said housing and having a plurality of conductors on the interior surface thereof juxtaposed to the ends of said bores and electrically connected to said contacts; and a common conductor movable into successive engagement with said contacts to make a circuit between successive ones of said plate conductors.

6. In a directional and speed control switch for an electric motor, the combination of: a housing having actuator bores provided therein, each of said actuator bores having a plurality of contact receiving bores associated therewith; an actuator mounted for movement in each of said actuator bores and having a common conductor mounted thereupon; a contact movably mounted in each of said contact receiving bores; and an external common contact plate secured to said housing behind all of said bores provided with conductors electrically connected with said contacts and disposable in circuit relationship by the energization of one of said actuators and the resulting successive engagement of an associated common conductor with its respective plurality of contacts.

7. In a directional and speed control switch for an electric motor, the combination of: a housing having a plurality of contact receiving bores formed therein, said bores being arranged in groups and each bore in a group having portions of different depth than an adjacent bore; a common conductor movably mounted in said housing adjacent each of said groups; a contact movably mounted in each contact receiving bore; and a common contact plate secured to the back of said housing adjacent the ends of all of said bores, said plate having conductors electrically connected to said contacts and integrateable into a common circuit by the successive engagement of one of said common conductors with the contacts of its associated group.

8. In a directional and speed control switch for an electric motor, the combination of: a housing having a plurality of contact receiving bores formed therein, said bores being arranged in groups and each bore in a group being of different depth than an adjacent bore; a common conductor movably mounted in said housing adjacent each of said groups; a contact movably mounted in each contact receiving bore, all of said contacts being of substantially uniform length; resilient conductors disposed in each of said contact receiving bores for biasing said contacts therein; and a plate secured to the back of said housing adjacent the ends of said bores, said plate having conductors electrically connected by said resilient conductors to said contacts and integrateable into a common circuit by the successive engagement of one of said common conductors with the contacts of its associated group.

9. A unitary switch housing having an actuator receiving bore extending from the front to the back thereof and a plurality of contact receiving bores disposed circumferentially of said actuator receiving bore, each contact receiving bore being of different depth than an adjacent bore so that movable contacts of uniform length mounted in said contact receiving bores will project unequal distances from the front of said housing.

10. In a directional and variable speed control switch for an electric motor, the combination of: a housing having a circular group of contact receiving bores and an actuator bore located centrally of said group; a movable directional contact mounted in one of the bores of said group; a plurality of speed controlling movable contacts disposed in the other bores of said group; a movable actuator disposed in said actuator bore; a common conductor movable by said actuator into successive engagement with said directional and speed controlling movable contacts; and an external contact back plate engageable by said contacts.

11. In a directional and variable speed control switch for an electric motor, the combination of: a housing having a plurality of groups of contact receiving bores and an actuator bore located centrally of each of said groups, an external back on said housing adjacent the extremities of all of said bores; an input conductor and a plurality of output conductors secured to said back; movable conductor contacts mounted in one of the bores of each of said groups and electrically connected to said input conductor; a movable directional contact mounted in another of the bores of each of said groups; a plurality of speed controlling movable contacts disposed in the other bores of each of said groups; movable actuators disposed in said actuator bores; and common conductors movable by said actuators into engagement with said conductor, directional and speed controlling movable contacts.

12. In a directional and variable speed control switch for an electric motor, the combination of: a housing having a plurality of groups of contact receiving bores and an actuator bore located centrally of each of said groups; a back on said housing adjacent the extremities of all of said bores; an input conductor and a plurality of output conductors secured to said back; movable conductor contacts mounted in one of the bores of each of said groups and electrically connected to said input conductor; a movable directional contact mounted in another of the bores of each of said groups; a plurality of movable, speed controlling contacts projecting shorter distances from said housing than said directional and conductor contacts and projecting different distances from one another and being mounted in the other bores of said groups; movable actuators disposed in said actuator bores; and common conductors movable by said actuators into engagement with said conductor and directional contacts whereby said common conductors are placed in series with said input conductor and moved into successive engagement with said speed controlling contacts to progressively place said contacts in series with said output conductors.

References Cited in the file of this patent

UNITED STATES PATENTS

| | | |
|---|---|---|
| 982,913 | Whittingham | Jan. 31, 1911 |
| 1,744,626 | Getchell | Jan. 21, 1930 |
| 1,795,164 | Crookshanks et al. | Mar. 3, 1931 |
| 1,903,135 | Rees | Mar. 28, 1933 |
| 1,973,305 | Bowers | Sept. 11, 1934 |
| 1,999,313 | Alexonis | Apr. 30, 1935 |
| 2,066,575 | Ralph | Jan. 5, 1937 |
| 2,448,982 | Jensen | Sept. 7, 1948 |
| 2,550,777 | Cobb et al. | May 1, 1951 |
| 2,576,394 | Frei et al. | Nov. 27, 1951 |

FOREIGN PATENTS

| | | |
|---|---|---|
| 620,961 | Great Britain | Apr. 1, 1949 |